US006273703B1

(12) United States Patent
Hirschkorn

(10) Patent No.: US 6,273,703 B1
(45) Date of Patent: Aug. 14, 2001

(54) EXTRUDER HEAD WITH PIVOTAL PARTS

(75) Inventor: Ingo Hirschkorn, Neu Wulmstorf (DE)

(73) Assignee: ThyssenKrupp AG, Dusseldorf (DE)

( * ) Notice: Subject to any disclaimer, the term of this patent is extended or adjusted under 35 U.S.C. 154(b) by 0 days.

(21) Appl. No.: 09/237,417

(22) Filed: Jan. 26, 1999

(30) Foreign Application Priority Data

Jan. 29, 1998 (DE) .............................. 198 03 269

(51) Int. Cl.⁷ ................................................. B29C 47/08
(52) U.S. Cl. ...................................... 425/188; 425/192 R
(58) Field of Search .................................. 425/188, 190, 425/192 R, 133.5, 462

(56) References Cited

U.S. PATENT DOCUMENTS

| | | | |
|---|---|---|---|
| 4,354,814 | * 10/1982 | Grimminger et al. | 425/188 |
| 4,372,736 | 2/1983 | Gooch et al. | 425/192 R |
| 4,824,353 | 4/1989 | Hirschkorn | 425/190 |
| 5,472,332 | * 12/1995 | Gohlisch et al. | 425/188 |
| 5,720,986 | * 2/1998 | Gohlisch et al. | 425/188 |
| 5,851,561 | * 12/1998 | Hirschkorn | 425/188 |

FOREIGN PATENT DOCUMENTS 42 35 280  10/1993 (DE) .

* cited by examiner

*Primary Examiner*—Nam Nguyen
*Assistant Examiner*—Joseph Leyson
(74) *Attorney, Agent, or Firm*—Herbert Dubno; Andrew Wilford

(57) ABSTRACT

An extruder head has a stationary head part and upper and lower head parts pivotal about respective upper and lower axes on the stationary part between inner positions closely juxtaposed with each other and with the stationary part and outer positions separated from each other and from the stationary part. Respective upper and lower latches engageable between the respective movable head parts and the stationary head part retain the movable parts against the stationary part. A crosswise latch engageable between the movable head parts retains the movable parts against each other in the inner positions thereof. The crosswise latch includes an actuator mounted on one of the movable head parts and a retaining member engageable with the other of the movable head parts. The actuator is a hydraulic cylinder having a piston rod forming the retaining member. More particularly the cylinder is mounted on the upper movable head part.

7 Claims, 6 Drawing Sheets

EXTRUDER HEAD WITH PIVOTAL PARTS

FIELD OF THE INVENTION

The present invention relates to an extruder head. More particularly this invention concerns such a head having at least two pivoted parts.

BACKGROUND OF THE INVENTION

An extruder head is known which is used to make complex parts of different resins. Such a head is connected to a plurality of extruders and has head parts each forming a passage having an upstream end connected to a respective one of the extruders and a downstream end opening at a die. The various resins are forced at very great pressure, often in excess of 500 bar, along the respective passages to merge at the die and form a workpiece of the desired shape.

It is necessary to be able to open up such a head assembly, for servicing and cleaning and for changing the die. Accordingly German patent 4,234,280 of Kaufmann and US Pat. No. 4,824,353 and 5,851,561 both of Hirschkorn propose systems where the head parts are pivoted on a stationary mold part so that they can be moved between positions where their downstream passage ends merge at the die and positions with their downstream ends separated and the passages exposed.

Such system are all very bulky and difficult to maintain tightly together under the enormous working pressures of the extrusion apparatus. Accordingly hydraulic locks are provided which clamp the head parts to the stationary head part. Such locks normally are constituted as hydraulic cylinders carried on the stationary part and having piston rods that engage formations of the respective head parts to pull same solidly together and against the stationary part.

While these arrangements are relatively effective, they do not completely rule out shifting of the head parts and, therefore, leakage from between the movable parts of the extruder head. The cylinders must exert considerable clamping force in order to hold the interfaces between the head parts together even though they usually are able to effectively prevent leakage between the head parts and the actual mold.

OBJECTS OF THE INVENTION

It is therefore an object of the present invention to provide an improved extruder head with pivotal parts.

Another object is the provision of such an improved extruder head with pivotal parts which overcomes the above-given disadvantages, that is which can be operated at very high pressure without fear of leakage from between the head parts.

SUMMARY OF THE INVENTION

An extruder head has according to the invention a stationary head part and upper and lower head parts pivotal about respective upper and lower axes on the stationary part between inner positions closely juxtaposed with each other and with the stationary part and outer positions separated from each other and from the stationary part. Respective upper and lower latches engageable between the respective movable head parts and the stationary head part retain the movable parts against the stationary part. According to the invention a crosswise latch engageable between the movable head parts retains the movable parts against each other in the inner positions thereof.

This crosswise latch therefore is effective between the movable parts, that is latches one to the other. It normally extends across an interface plane between these parts so it is highly effective in holding them together at this interface plane. In addition the farther this crosswise latch is spaced from the pivot axes of the movable parts, the greater the mechanical advantage and the more strongly it will hold together the two movable parts.

According to the invention the crosswise latch includes an actuator mounted on one of the movable head parts and a retaining member engageable with the other of the movable head parts. The actuator is a hydraulic cylinder having a piston rod forming the retaining member. More particularly the cylinder is mounted on the upper movable head part.

For a very compact construction the lower movable head part has a formation with a face extending crosswise of the piston rod and engageable therewith. The piston rod has a head pivotal between a position engageable with the face and a position movable past the face. The lower movable head part is formed with a passage generally complementary to the head and through which the head is movable. The face is formed at an end of the passage. Thus the piston rod passes through the passage once the movable mold parts are in the inner position, and then the piston rod is advanced, rotated, and retracted to lock the two movable parts together.

Normally in accordance with the invention the crosswise latch includes two such actuators and respective retaining members spaced apart parallel to the axes.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
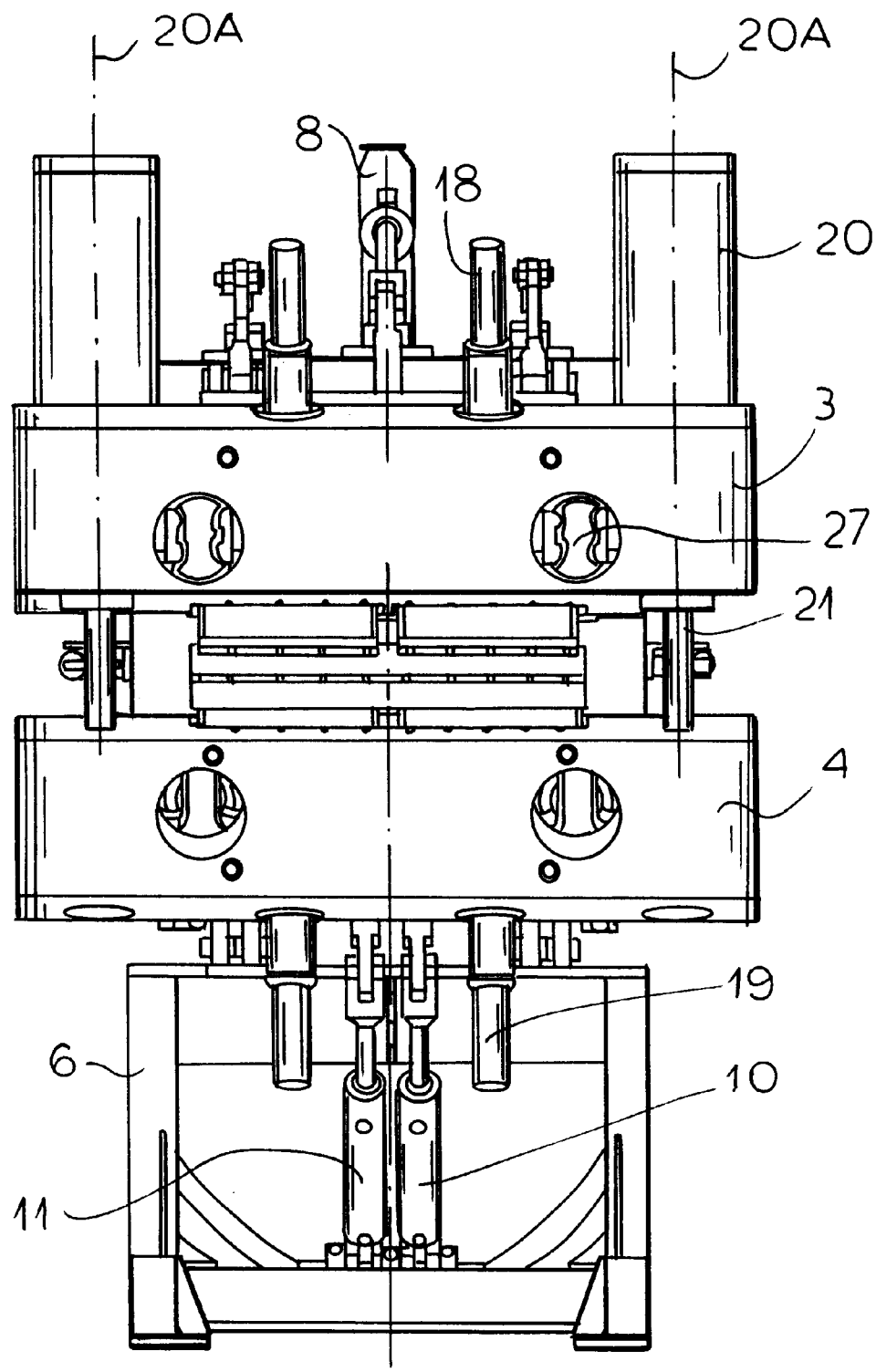
FIG. 2 is an end view of the assembly of FIG. 1.
Figure 3:
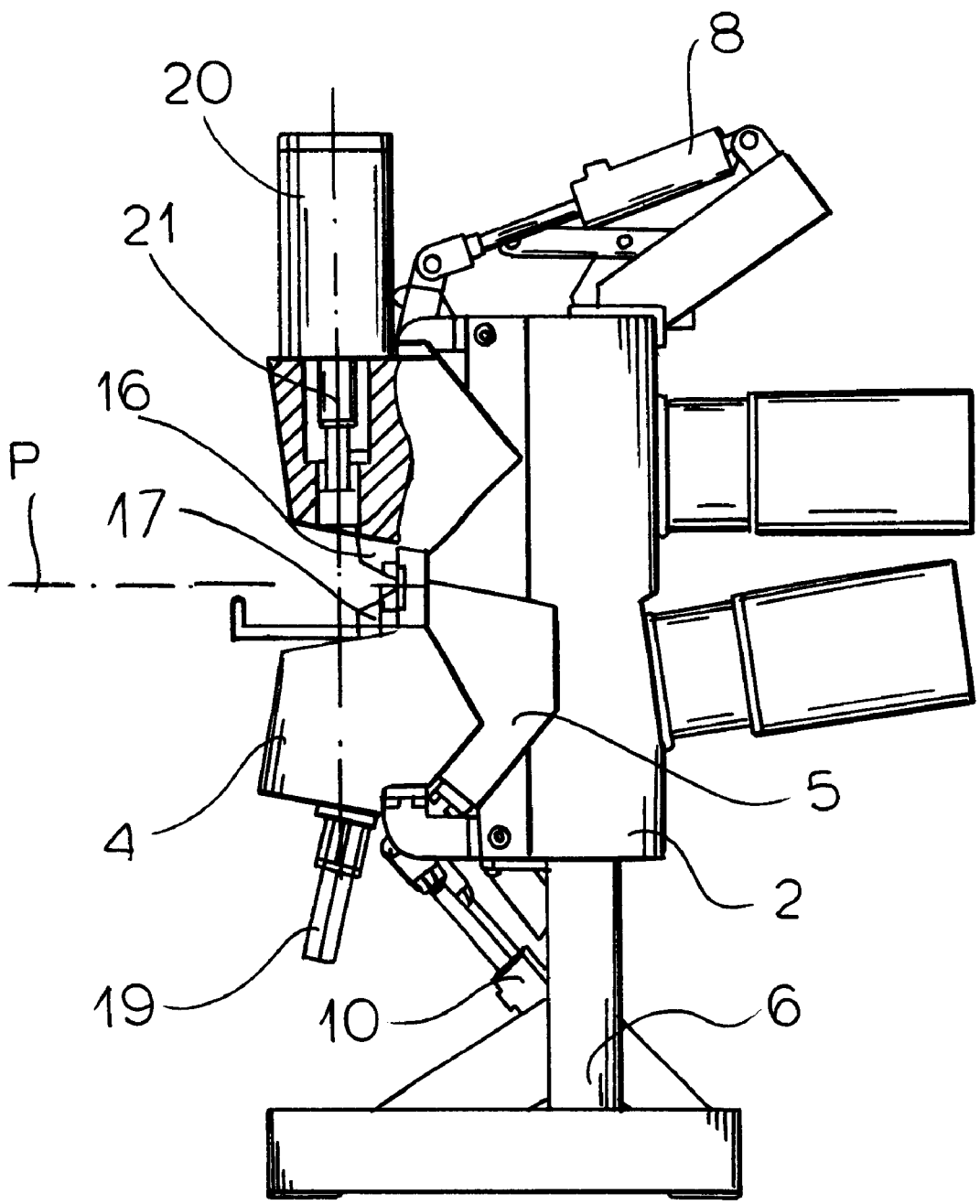
FIGS. 3 and 4 are partly sectional side views illustrating the assembly in the closed and open positions.
Figure 4:
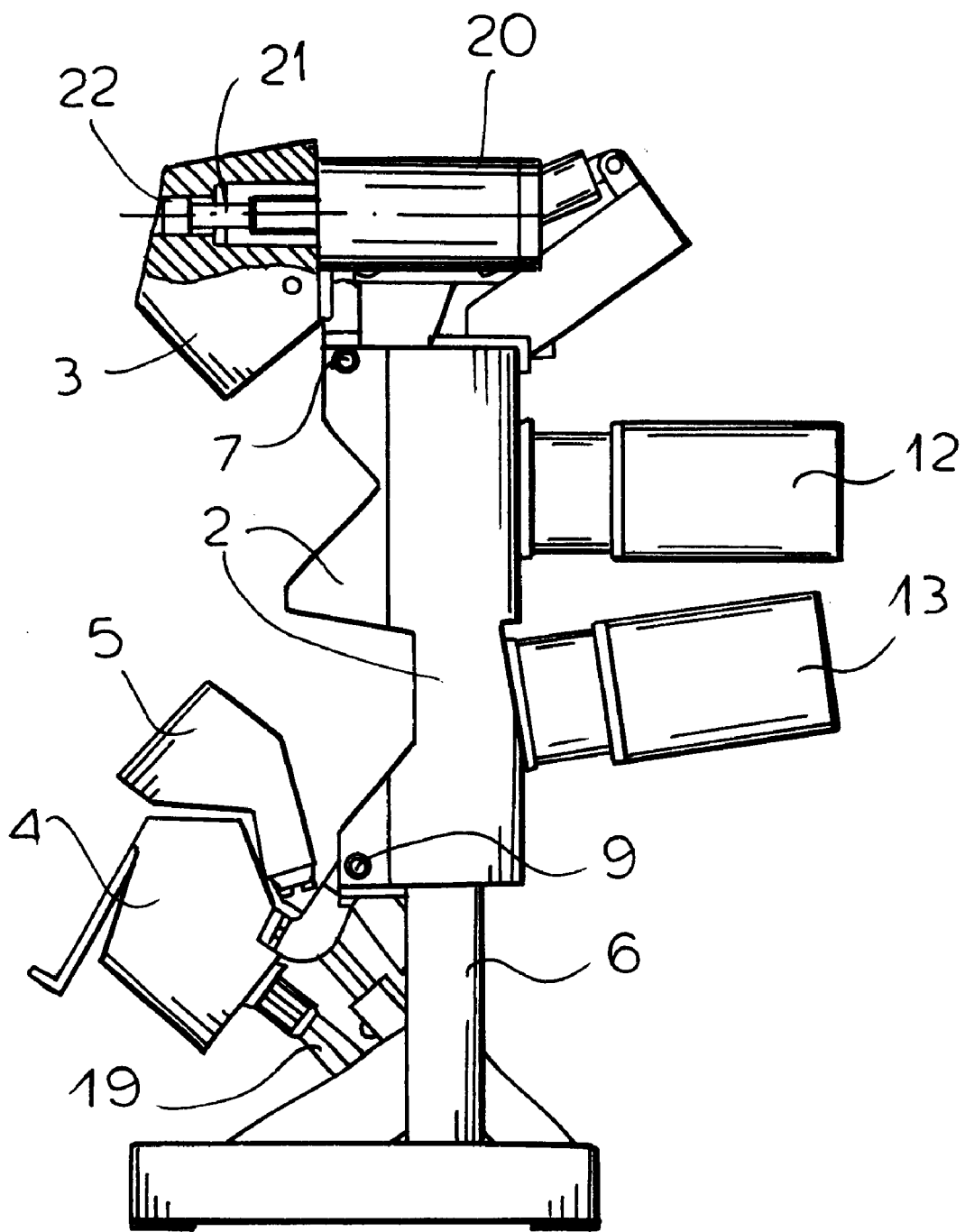
Figure 5:
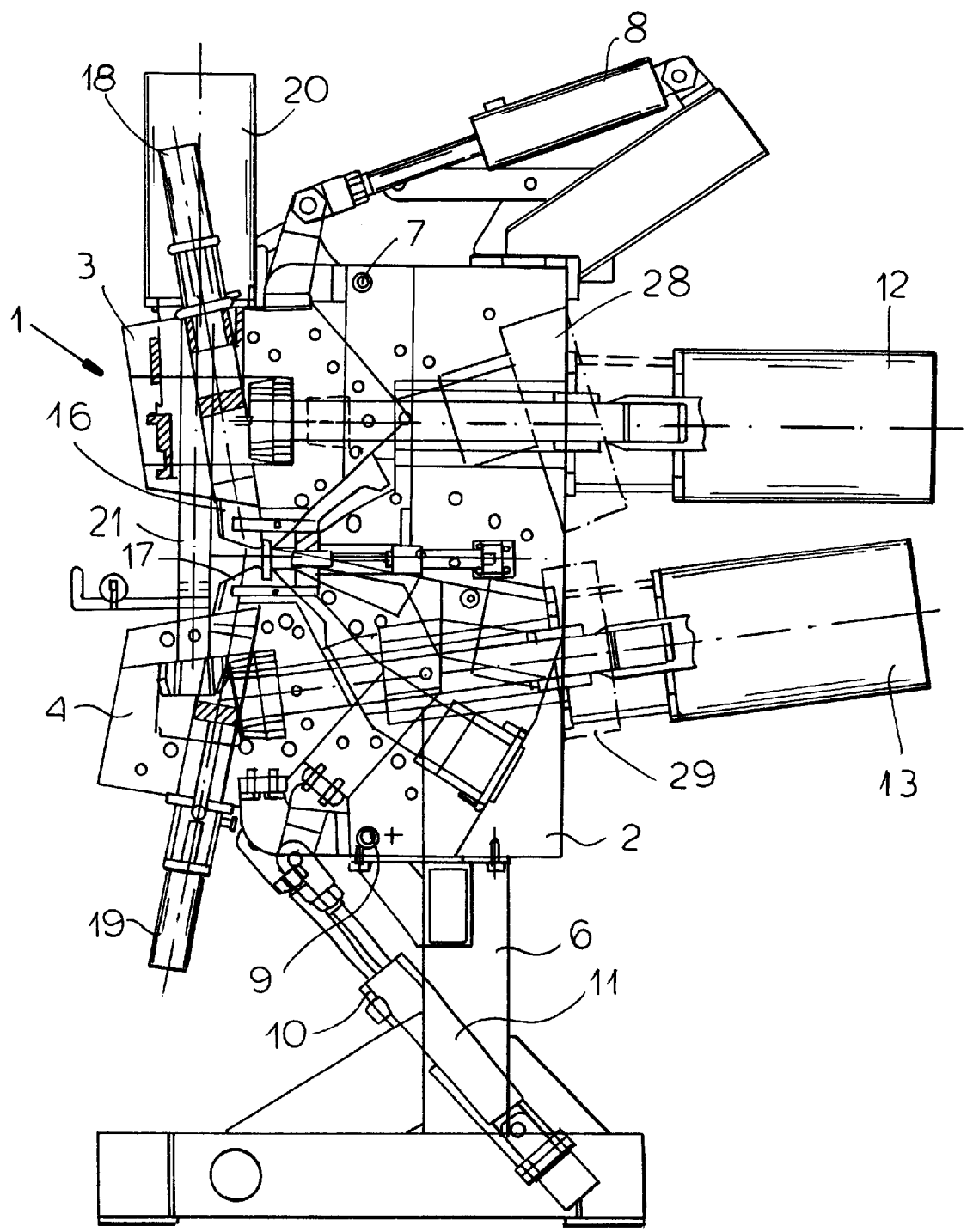
FIG. 5 is a side view in vertical section showing the structure in more detail.

As seen in the drawing, an extruder head 1 has a stationary head part 2, an upper movable head part 3, a lower movable head part 4, and a middle or intermediate movable head part 5. The fixed part 2 is fixed at the upper end of a stationary column 6 and can be fitted to two extruders shown schematically at 28 and 29 in FIG. 5 as described in above-cited U.S. Pat. No. 4,824,353. The upper part 3 is pivotal about an upper horizontal axis 7 by means of a respective cylinder 8. The lower part 4 is pivotal about a parallel lower axis 9 by means of a cylinder 10 and another cylinder 11 also pivots the intermediate part 5 about the same axis 9. Thus the parts 3, 4, and 5 can be moved between an inner position engaged closely together and shown in FIG. 3 and an outer position spaced well apart and shown in FIG. 4. Respective generally horizontally effective latching cylinders 12 and 13 can lock the parts 3 and 4 against the part 2 in the inner positions by means of hammer heads 27 (FIG. 2) on the ends of piston rods of the cylinders 12 and 13 as also described in U.S. Pat No. 4,824,353. A cassette or preforming die 14 with a final or finishing plate 15 emitting a profile strip is retained by clamp wedges 16 and 17 actuated by respective clamping cylinders 18 and 19 in a complementary recess of the head 1. This structure is largely standard.

Figure 1:
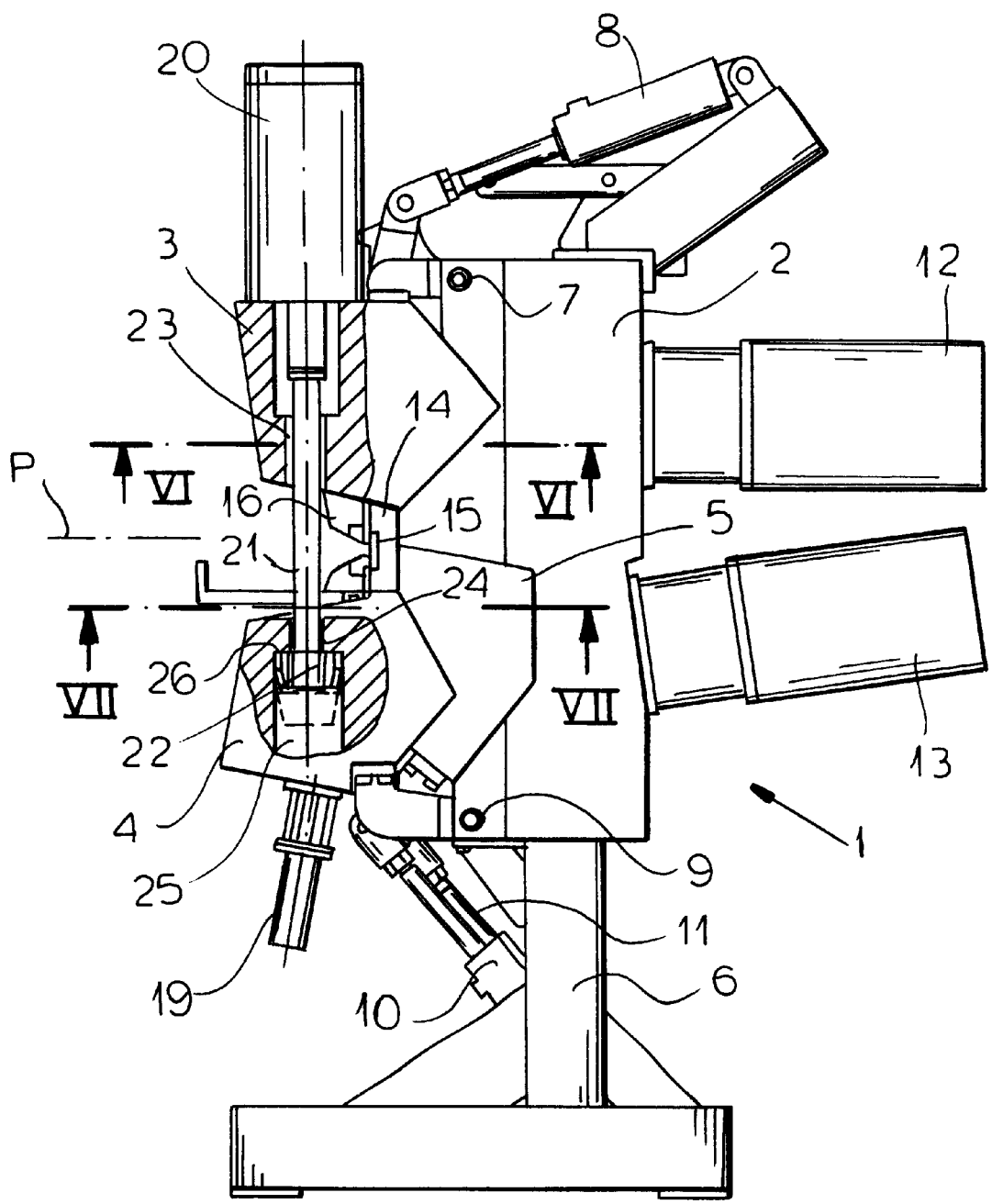
FIG. 1 is a small-scale side view partly in section showing the extruder assembly according to the invention.
Figure 7:
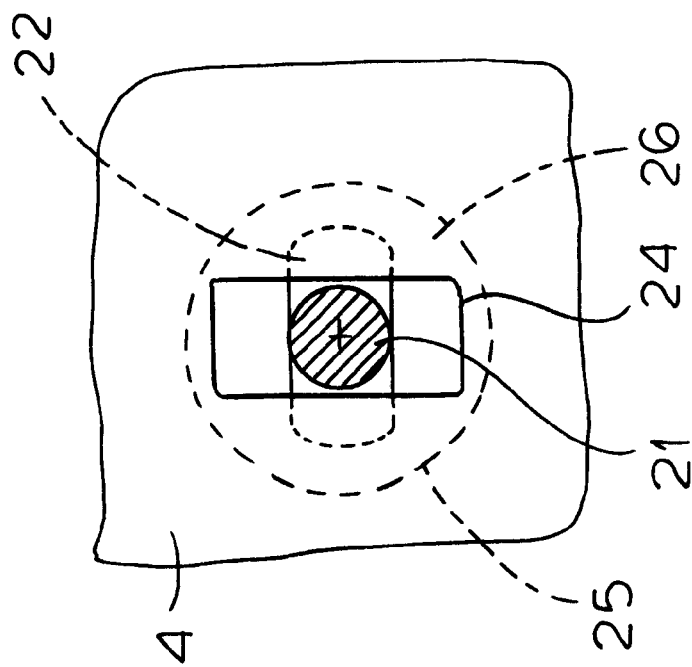
FIGS. 6 and 7 are large-scale sectional views taken along respective lines VI—VI and VII—VII of FIG. 1.
Figure 6:
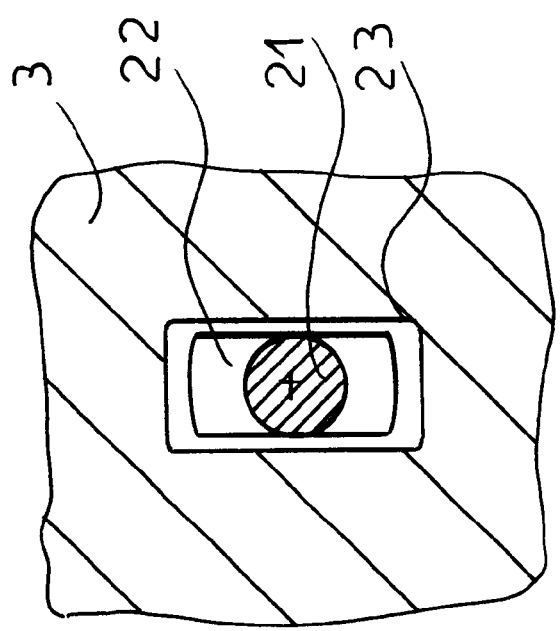

According to the invention the upper movable head part 3 carries on its upper side a pair of latching cylinders 20 having respective piston rods 21 effective along vertical axes 20A. The outer ends of these rods 21 have transversely projecting hammer heads 22 each engageable through passages or slots 23 and 24 (FIGS. 1, 6, and 7) of complementary section in the upper and lower mold parts 3 and 4 and seatable against a shoulder surface 26 of a cylindrical counterbore 25 in the part 4. Thus once the parts 3 and 4 are in the closed position of FIG. 3, the rods 21 can be extended until the heads 22 have passed completely through the respective aligned passages 23 and 24 and across a horizontal interface plane P between them. Once the heads 22 have passed the surfaces 26 they are rotated through 90°, or through $(180/n)°$ if the heads 22 have n rather than two lobes, and are retracted back up, pulling the heads 22 against the surfaces 26 and solidly locking the two parts 3 and 4 together.

I claim:

1. An extruder head comprising:

a stationary head part;

upper and lower head parts pivotal about respective upper and lower axes on the stationary part between inner positions closely juxtaposed with each other and with the stationary part and outer positions separated from each other and from the stationary part;

respective upper and lower latch means engageable between the respective movable head parts and the stationary head part for retaining the movable parts against the stationary part; and a crosswise latch means including an actuator fixed on one of the movable head parts and a retaining member movable relative to the actuator and engageable with the other of the movable head parts for retaining the movable parts against each other in the inner positions thereof.

2. The extruder head defined in claim 1 wherein the actuator is a hydraulic cylinder having a piston rod forming the retaining member.

3. The extruder head defined in claim 2 wherein the cylinder is mounted on the upper movable head part.

4. The extruder head defined in claim 3 wherein lower movable head part has a formation with a face extending crosswise of the piston rod and engageable therewith.

5. The extruder head defined in claim 4 wherein the piston rod has a head pivotal between a position engageable with the face and a position movable past the face.

6. The extruder head defined in claim 5 wherein the lower movable head part is formed with a passage generally complementary to the head and through which the head is movable, the face being formed at an end of the passage.

7. The extruder head defined in claim 1 wherein the crosswise latch means includes two such actuators and respective retaining members spaced apart parallel to the axes.

* * * * *